United States Patent
Takata (10) Patent No.: US 10,069,163 B2
(45) Date of Patent: Sep. 4, 2018

(54) FUEL CELL

(71) Applicant: MURATA MANUFACTURING CO., LTD., Nagaokakyo-Shi, Kyoto-fu (JP)

(72) Inventor: Kazuhide Takata, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 109 days.

(21) Appl. No.: 14/611,426

(22) Filed: Feb. 2, 2015

(65) Prior Publication Data

US 2015/0147676 A1 May 28, 2015

Related U.S. Application Data

(63) Continuation of application No. PCT/JP2013/070982, filed on Aug. 2, 2013.

(30) Foreign Application Priority Data

Aug. 3, 2012 (JP) ................. 2012-173074

(51) Int. Cl.
| | | |
|---|---|---|
| *H01M 8/02* | (2016.01) | |
| *H01M 8/10* | (2016.01) | |
| *H01M 8/2435* | (2016.01) | |
| *H01M 8/1004* | (2016.01) | |
| *H01M 8/1213* | (2016.01) | |

(Continued)

(52) U.S. Cl.
CPC ....... *H01M 8/2435* (2013.01); *H01M 8/0228* (2013.01); *H01M 8/1004* (2013.01); *H01M 8/1213* (2013.01); *H01M 8/2432* (2016.02); *H01M 4/9033* (2013.01); *H01M 8/0256* (2013.01); *H01M 2008/1293* (2013.01); *H01M 2300/0074* (2013.01); *H01M 2300/0094* (2013.01)

(58) Field of Classification Search
CPC ............ H01M 8/0258; H01M 8/2432; H01M 8/0228; H01M 8/1004; H01M 8/1213; H01M 4/9033; H01M 8/0256; H01M 2008/12393; H01M 2003/0074; H01M 2300/0094; Y02E 60/50; Y02E 60/525

See application file for complete search history.

(56) References Cited

U.S. PATENT DOCUMENTS

| | | |
|---|---|---|
| 5,516,597 A | 5/1996 | Singh et al. |
| 2003/0077498 A1 | 4/2003 | Cable et al. |

(Continued)

FOREIGN PATENT DOCUMENTS

| | | |
|---|---|---|
| JP | 1-128359 | 5/1989 |
| JP | 7-45291 | 2/1995 |

(Continued)

OTHER PUBLICATIONS

PCT/JP2013/070982 ISR dated Oct. 18, 2013.
PCT/JP2013/070982 Written Opinion dated Oct. 18, 2013.

*Primary Examiner* — Stewart A Fraser
(74) *Attorney, Agent, or Firm* — Arent Fox LLP (57) ABSTRACT

A fuel cell having an air electrode provided on one surface of a solid oxide electrolyte layer; a fuel electrode on the other surface thereof; and a separator 11 on the air electrode. A middle layer is further provided between the separator and the air electrode in order to suppress the diffusion of constitutional elements of the air electrode to the separator.

13 Claims, 6 Drawing Sheets

(51) Int. Cl.
H01M 8/0228 (2016.01)
H01M 8/2432 (2016.01)
H01M 8/124 (2016.01)
H01M 4/90 (2006.01)
H01M 8/0256 (2016.01)

(56) References Cited

U.S. PATENT DOCUMENTS

| | | | |
|---|---|---|---|
| 2005/0227134 A1 | 10/2005 | Nguyen | |
| 2007/0037031 A1* | 2/2007 | Cassidy | C22C 29/005 429/465 |
| 2007/0072057 A1* | 3/2007 | Laresgoiti | H01M 4/9066 429/496 |
| 2007/0184324 A1* | 8/2007 | Lyons | C04B 35/48 429/486 |
| 2009/0239120 A1* | 9/2009 | Moteki | H01M 8/0247 429/492 |
| 2010/0055533 A1 | 3/2010 | Kebbede et al. | |
| 2011/0177424 A1 | 7/2011 | Goto | |

FOREIGN PATENT DOCUMENTS

| | | |
|---|---|---|
| JP | 10-508719 | 8/1998 |
| JP | 11-307114 | 11/1999 |
| JP | 2003-132914 A | 5/2003 |
| JP | 2008041469 A * | 2/2008 |
| JP | 2008-117702 A | 5/2008 |
| JP | 2008-305669 A | 12/2008 |
| JP | 2010-003662 A | 1/2010 |
| JP | 2010-062145 A | 3/2010 |
| JP | 2011-171289 A | 9/2011 |

* cited by examiner

FUEL CELL

CROSS REFERENCE TO RELATED APPLICATIONS

The present application is a continuation of International application No. PCT/JP2013/070982, filed Aug. 2, 2013, which claims priority to Japanese Patent Application No. 2012-173074, filed Aug. 3, 2012, the entire contents of each of which are incorporated herein by reference.

FIELD OF THE INVENTION

The present invention relates to a fuel cell. The present invention relates particularly to a solid oxide fuel cell.

BACKGROUND OF THE INVENTION

In recent years, fuel cells have been largely paid attention to as a new energy source. Fuel cells include solid oxide fuel cells (SOFC), molten carbonate fuel cells, phosphoric acid fuel cell and solid polymer fuel cells. Among these fuel cells, solid oxide fuel cells do not necessarily need to use a liquid constituent and are capable of reforming a hydrocarbon fuel in their interior when the hydrocarbon fuel is used. Hence, research and development on solid oxide fuel cells is being actively carried out. For example, Patent Literature 1 describes one example of solid oxide fuel cells.

Patent Literature 2 describes use of an air electrode containing a perovskite-type oxide represented by $ABO_3$.

Patent Literature 1: Japanese Patent Laid-Open No. 2010-3662

Patent Literature 2: Japanese Patent Laid-Open No. 2008-305669

SUMMARY OF THE INVENTION

In recent years, the demand of further improvement of the reliability of fuel cells has been raised more.

The present invention has a major object to provide a fuel cell having improved reliability.

The fuel cell according to the present invention has a power generating component and a separator. The power generating component has a solid oxide electrolyte layer, an air electrode and a fuel electrode. The air electrode is disposed on one principal surface of the solid oxide electrolyte layer. The air electrode contains a perovskite-type oxide. The fuel electrode is disposed on the other principal surface of the solid oxide electrolyte layer. The separator is disposed on the air electrode. The separator has flow paths facing the air electrode and demarcated and formed thereon. The separator has a separator body and interconnectors. The interconnectors are disposed in the separator body. The interconnectors are connected to the air electrode. The fuel cell according to the present invention further has a middle layer to suppress the diffusion of constitutional elements of the air electrode to the separator body. The middle layer is disposed between the separator body and the air electrode.

In a specific aspect of the fuel cell according to the present invention, the middle layer is formed of a ceramic.

In another specific aspect of the fuel cell according to the present invention, the separator body is formed of a ceramic.

In the fuel cell according to the present invention, the middle layer preferably contains a $(Ce_{1-x}D_x)O_2$ wherein D is at least one selected from the group consisting of Y, La, Pr, Nd, Sm, Eu, Gd, Tb, Dy, Ho, Er, Tm, Yb and Lu, and $0 \leq x \leq 0.5$.

In yet another specific aspect of the fuel cell according to the present invention, x is 0.

In another specific aspect of the fuel cell according to the present invention, the power generating component further has another middle layer disposed between the solid oxide electrolyte layer and the air electrode. The other middle layer contains a $(Ce_{1-x}D_x)O_2$ wherein D is at least one selected from the group consisting of Y, La, Pr, Nd, Sm, Eu, Gd, Tb, Dy, Ho, Er, Tm, Yb and Lu, and $0<x \leq 0.5$.

In another specific aspect of the fuel cell according to the present invention, the air electrode contains $ABO_3$. In the formula, A is at least one among rare earth elements and alkaline earth elements. B is at least one selected from the group consisting of Co, Fe and Ni.

In yet another specific aspect of the fuel cell according to the present invention, the air electrode contains at least one selected from the group consisting of $(La,Sr)CoO_3$, $(Sm,Sr)CoO_3$, $(La,Sr)FeO_3$, $(La,Sr)(Co,Fe)O_3$, $(Ba,Sr)(Co,Fe)O_3$ and $La(Ni,Fe)O_3$.

In still another specific aspect of the fuel cell according to the present invention, the separator body contains at least one of stabilized zirconias and partially stabilized zirconias stabilized with a stabilizing material.

In still yet another specific aspect of the fuel cell according to the present invention, the separator body has a first part and a second part. The first part is disposed on the air electrode. The first part has flow paths demarcated and formed thereon. The second part is disposed in a region of the separator body where the air electrode is not provided. The second part is provided with flow paths through which a fuel gas to be supplied to the fuel electrode passes. The middle layer does not contact with the second part.

The present invention can provide a fuel cell having improved reliability.

DETAILED DESCRIPTION OF THE PREFERRED EMBODIMENTS

Hereinafter, examples of preferred embodiments of carrying out the present invention will be described. However, the following embodiments are only examples. The present invention is not limited to the following embodiments at all.

In each drawing referred to in embodiments and the like, members having substantially the same function will be referred to using the same reference sign. The drawings referred to in embodiments and the like are ones schematically illustrated, and the ratios and the like of dimensions of an object drawn in a drawing are different from those of an actual object in some cases. Also the dimensional ratios and the like of objects in different drawings are different in some cases. Specific dimensional ratios and the like of objects should be estimated in consideration of the following interpretations.

First Embodiment

Figure 1:
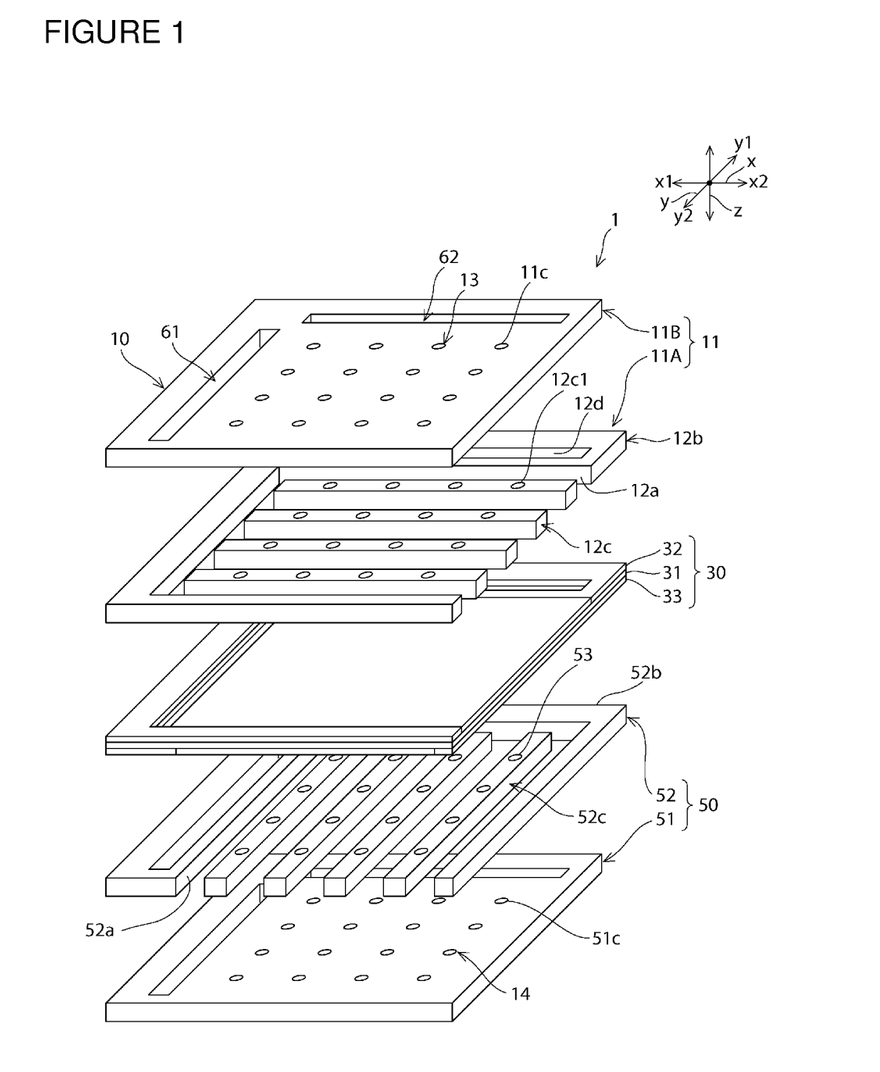
FIG. 1 is a schematic exploded perspective view of a fuel cell according to a first embodiment.
Figure 2:
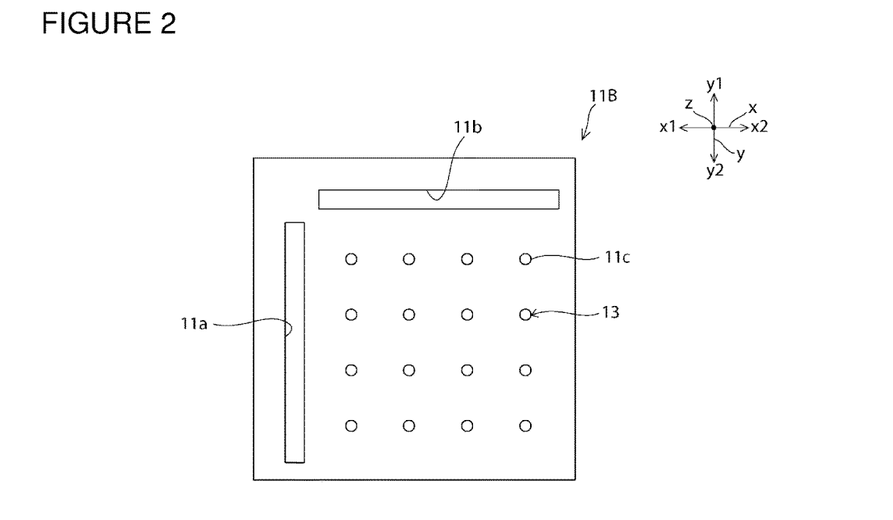
FIG. 2 is a schematic plan view of a first separator body in the first embodiment.
Figure 3:
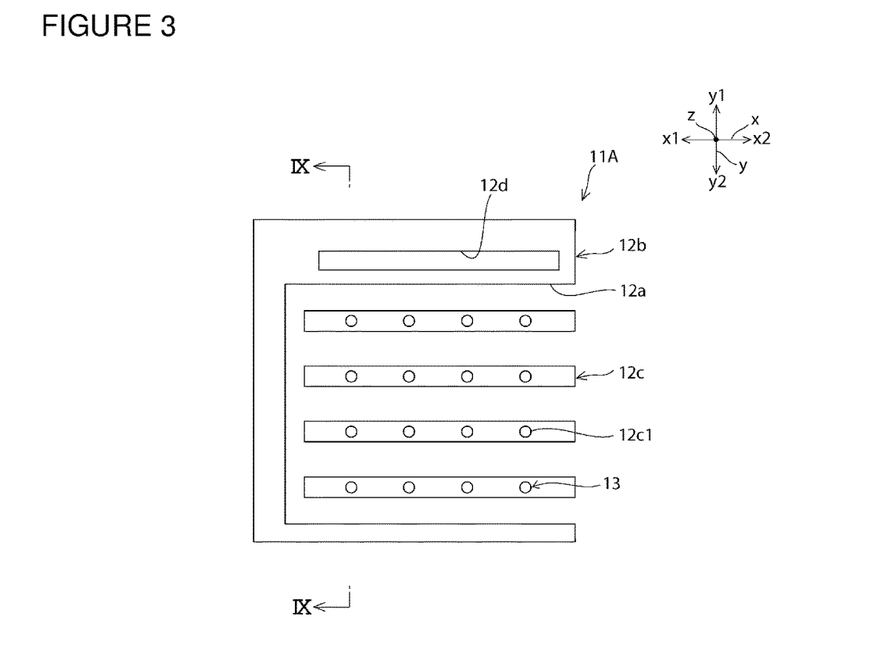
FIG. 3 is a schematic plan view of a first flow path forming member in the first embodiment.
Figure 4:
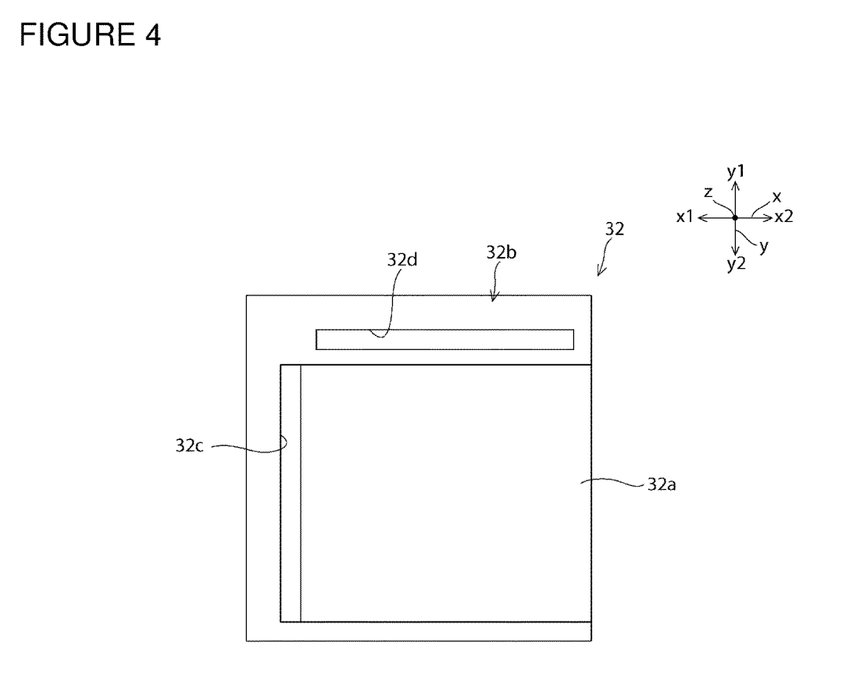
FIG. 4 is a schematic plan view of an air electrode layer in the first embodiment.
Figure 5:
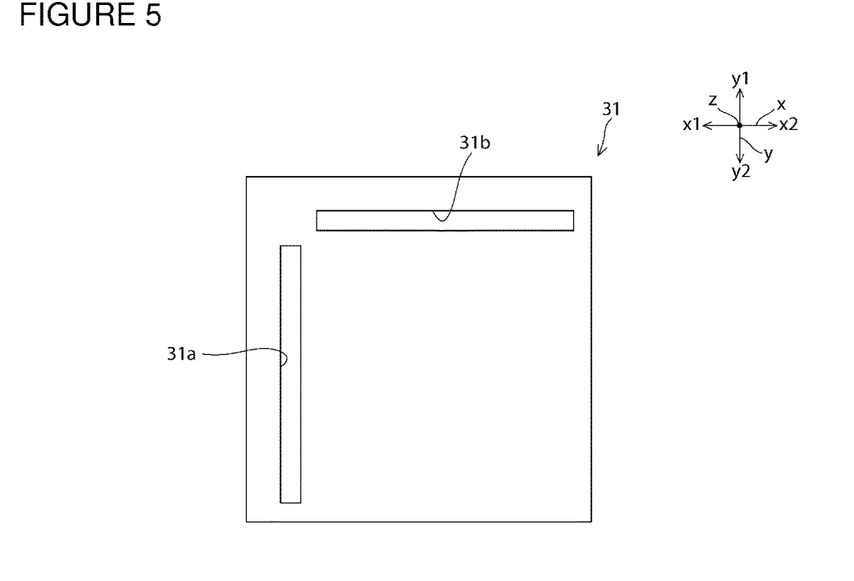
FIG. 5 is a schematic plan view of a solid oxide electrolyte layer in the first embodiment.
Figure 6:
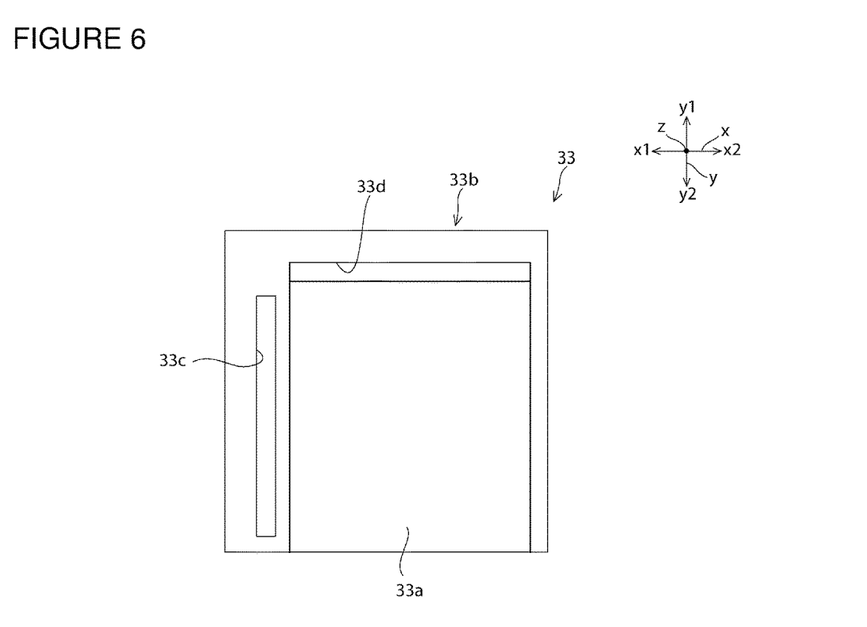
FIG. 6 is a schematic plan view of a fuel electrode layer in the first embodiment.
Figure 7:
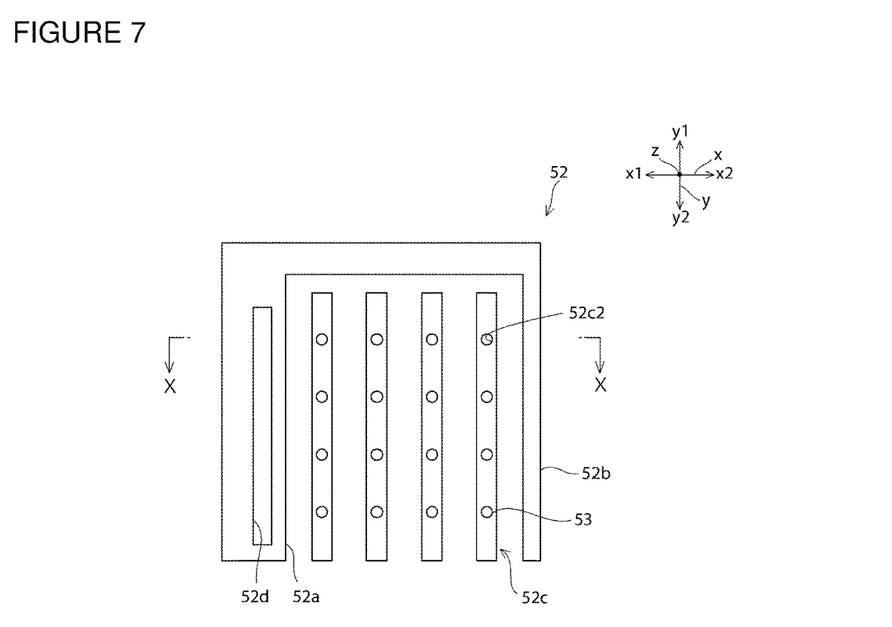
FIG. 7 is a schematic plan view of a second flow path forming member in the first embodiment.
Figure 8:
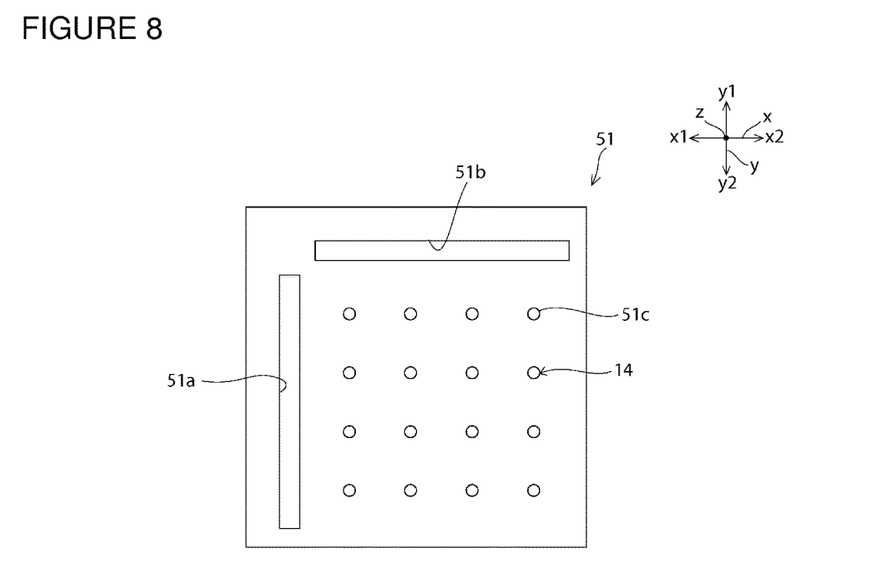
FIG. 8 is a schematic plan view of a second separator body in the first embodiment.
Figure 9:
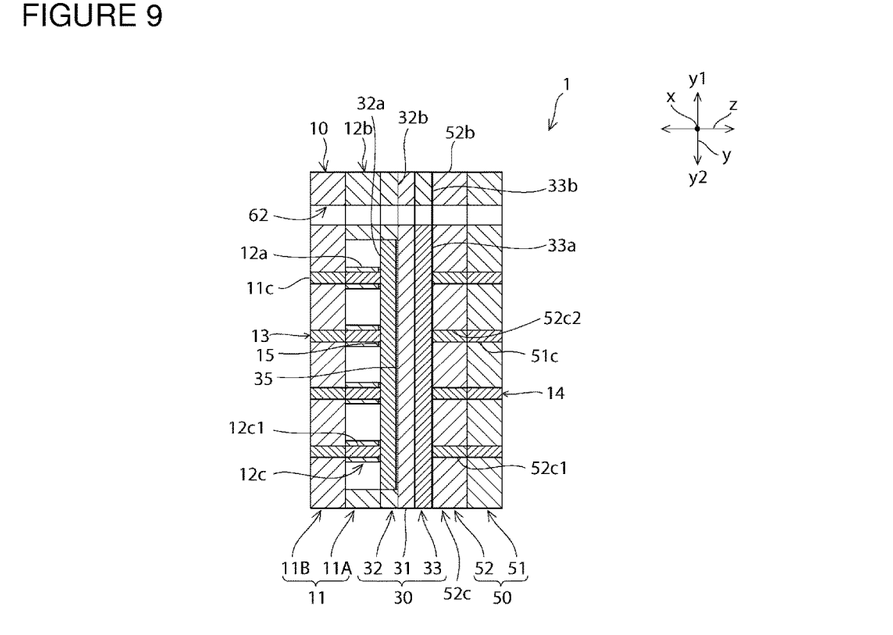
FIG. 9 is a schematic cross-sectional view taken on line IX-IX in FIG. 3.
Figure 10:
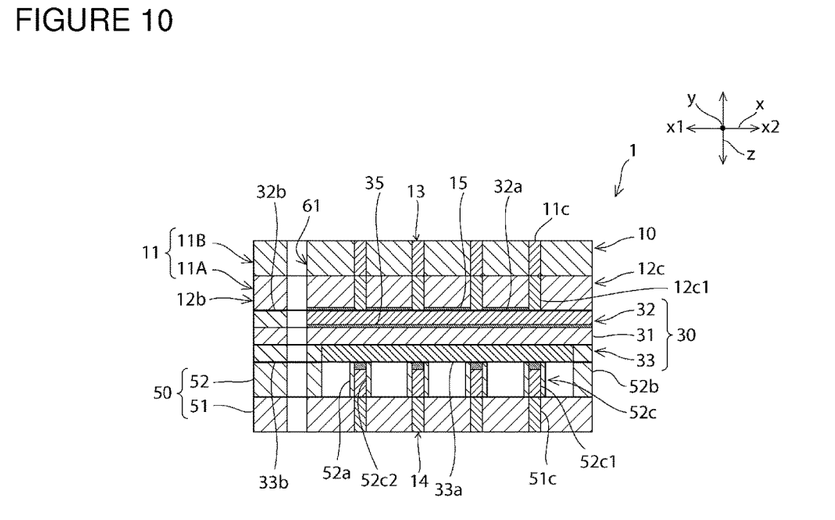
FIG. 10 is a schematic cross-sectional view taken on line X-X in FIG. 7.

FIG. 1 is a schematic exploded perspective view of a fuel cell according to a first embodiment. FIG. 2 is a schematic plan view of a first separator body in the first embodiment. FIG. 3 is a schematic plan view of a first flow path forming member in the first embodiment. FIG. 4 is a schematic plan view of an air electrode layer in the first embodiment. FIG. 5 is a schematic plan view of a solid oxide electrolyte layer in the first embodiment. FIG. 6 is a schematic plan view of a fuel electrode layer in the first embodiment. FIG. 7 is a schematic plan view of a second flow path forming member in the first embodiment. FIG. 8 is a schematic plan view of a second separator body in the first embodiment. FIG. 9 is a schematic cross-sectional view taken on line IX-IX in FIG. 3. FIG. 10 is a schematic cross-sectional view taken on line X-X in FIG. 7.

As shown in FIG. 1, FIG. 9 and FIG. 10, a solid oxide fuel cell 1 according to the present embodiment has a first separator 10, a power generating component 30, and a second separator 50. In the solid oxide fuel cell 1, the first separator 10, the power generating component 30 and the second separator 50 are stacked in this order.

Here, the solid oxide fuel cell 1 according to the present embodiment has only one power generating component 30. The present invention, however, is not limited to this constitution. The solid oxide fuel cell according to the present invention may have, for example, a plurality of power generating components. In this case, adjacent power generating components are separated by a separator. The electric connection between power generating components can be carried out by interconnectors. The interconnectors may be provided as separate bodies from separators, or separators may be made to have also a function as interconnectors by constituting the separators of an electroconductive material. That is, the interconnectors may be formed as unified bodies with the separators.

(Power Generating Component 30)

The power generating component 30 is a section in which an oxidizing agent gas supplied from an oxidizing agent gas flow path (manifold for the oxidizing agent gas) 61 and a fuel gas supplied from a fuel gas flow path (manifold for the fuel gas) 62 are allowed to react to thereby generate a power. The oxidizing agent gas can be composed of, for example, an oxygen-containing gas or the like such as air or oxygen gas. The fuel gas can be a gas containing hydrogen gas or a hydrocarbon gas such as carbon monoxide gas, or the like.

(Solid Oxide Electrolyte Layer 31)

The power generating component 30 has a solid oxide electrolyte layer 31. The solid oxide electrolyte layer 31 preferably has a high ionic conductivity. The solid oxide electrolyte layer 31 can be formed of, for example, a stabilized zirconia or partially stabilized zirconia. Specific examples of the stabilized zirconia include an 8-mol % yttria-stabilized zirconia (8YSZ), a 10-mol % yttria-stabilized zirconia (10YSZ), a 10-mol % scandia 1-mol % ceria-stabilized zirconia (10SclCeSZ) and an 11-mol % scandia-stabilized zirconia (11ScSZ). Specific examples of the partially stabilized zirconia include a 3-mol % yttria-partially stabilized zirconia (3YSZ). The solid oxide electrolyte layer 31 can also be formed of, for example, a ceria-based oxide doped with Sm, Gd or the like, a perovskite-type oxide such as $La_{0.8}Sr_{0.2}Ga_{0.8}Mg_{0.2}O_{(3-\delta)}$ having $LaGaO_3$ as a base and Sr and Mg respectively replacing part of La and Ga, or the like.

In the solid oxide electrolyte layer 31, as shown in FIG. 5, throughholes 31a, 31b constituting part of the flow paths 61, 62 are formed.

The solid oxide electrolyte layer 31 is interposed between an air electrode layer 32 and a fuel electrode layer 33. That is, the air electrode layer 32 is formed on one principal surface of the solid oxide electrolyte layer 31, and the fuel electrode layer 33 is formed on the other principal surface thereof.

(Air Electrode Layer 32)

As shown in FIG. 4, the air electrode layer 32 has an air electrode 32a and a peripheral part 32b. In the peripheral part 32b, throughholes 32c, 32d constituting part of the flow paths 61, 62 are formed.

The air electrode 32a is a cathode. In the air electrode 32a, oxygen takes electrons, and oxygen ions are formed. The air electrode 32a is preferably one which is porous and high in electron conductivity and hardly causes a solid-solid reaction with the solid oxide electrolyte layer 31 and the like at a high temperature. The air electrode 32a preferably contains a perovskite-type oxide represented by $ABO_3$, and is more preferably constituted substantially of a perovskite-type oxide represented by $ABO_3$.

In the $ABO_3$, A is preferably, for example, at least one among rare earth elements and alkaline earth elements, and B is preferably, for example, at least one selected from the group consisting of Co, Fe and Ni.

Specific examples of the perovskite-type oxide represented by $ABO_3$ preferably include $(La,Sr)CoO_3$ (LSC), $(Sm,Sr)CoO_3$ (SSC), $(La,Sr)FeO_3$ (LSF), $(La,Sr)(Co,Fe)O_3$ (LSCF), $(Ba,Sr)(Co,Fe)O_3$ (BSCF) and $La(Ni,Fe)O_3$ (LNF), and mixtures thereof.

The peripheral part 32b can be formed of, for example, the same material as first and second separator bodies 11, 51 described below.

(Fuel Electrode Layer 33)

As shown in FIG. 6, the fuel electrode layer 33 has a fuel electrode 33a and a peripheral part 33b. In the peripheral part 33b, throughholes 33c, 33d constituting part of the flow paths 61, 62 are formed.

The fuel electrode 33a is an anode. In the fuel electrode 33a, oxygen ions and a fuel gas react and release electrons. The fuel electrode 33a is preferably one which is porous and high in electron conductivity and hardly causes a solid-solid reaction with the solid oxide electrolyte layer 31 and the like at a high temperature.

The fuel electrode 33a can be constituted of, for example, nickel oxide, a Ni-containing yttrium oxide-stabilized zirconia (yttria-stabilized zirconia (YSZ)), a Ni-containing calcium oxide-stabilized zirconia, a Ni-containing scandium oxide-stabilized zirconia (scandia-stabilized zirconia (ScSZ)), a Ni-containing cerium oxide-stabilized zirconia, a Ni-containing titanium oxide, a Ni-containing alumina, a Ni-containing magnesia, a Ni-containing yttria, a Ni-containing niobium oxide, or a Ni-containing tantalum oxide.

(Second Middle Layer 35)

As shown in FIG. 9 and FIG. 10, in the solid oxide fuel cell 1, the power generating component 30 further has a second middle layer 35. The second middle layer 35 is disposed between the solid oxide electrolyte layer 31 and the air electrode 32a. Hence, the second middle layer 35 needs to have ionic conductivity. The second middle layer 35 is not provided on the peripheral part 32b, of the air electrode layer 32, provided with the fuel gas flow path 62 through which the fuel gas passes. Therefore, the second middle layer 35 does not substantially contact with the fuel gas.

The second middle layer 35 is a layer to suppress a reaction of the air electrode 32a and the solid oxide electrolyte layer 31 and the formation of a layer of a low ionic conductivity between the air electrode 32a and the solid oxide electrolyte layer 31. The second middle layer 35 can be constituted of a material capable of suppressing the reaction of the air electrode 32a and the solid oxide electrolyte layer 31 and having ionic conductivity. The second middle layer 35 preferably contains, for example, a $(Ce_{1-x}D_x)O_2$ wherein D is at least one selected from the group consisting of Y, La, Pr, Nd, Sm, Eu, Gd, Tb, Dy, Ho, Er, Tm, Yb and Lu, and $0<x\leq0.5$, and is more preferably constituted substantially of a $(Ce_{1-x}D_x)O_2$ wherein D is at least one selected from the group consisting of Y, La, Pr, Nd, Sm, Eu, Gd, Tb, Dy, Ho, Er, Tm, Yb and Lu, and $0<x\leq0.5$. Further, if x is $0.1\leq x\leq0.2$, it is still more preferable because the ionic conductivity is made large.

(First Separator 10)

As shown in FIG. 1, FIG. 9 and FIG. 10, the first separator 10 is disposed on the air electrode layer 32 of the power generating component 30. The first separator 10 has a function of forming flow paths 12a to supply an oxidizing agent gas, supplied from the oxidizing agent gas flow path 61, to the air electrode 32a. In a fuel cell having a plurality of the power generating components, the first separator simultaneously has also a function of separating the fuel gas and the oxidizing agent gas.

The first separator 10 has a first separator body 11, interconnectors 13, and a first middle layer 15. The first separator body 11 has a first body part 11A and a second body part 11B. The second body part 11B is disposed on the air electrode 32a. In the second body part 11B, throughholes 11a, 11b (see FIG. 2) constituting part of the flow paths 61, 62 are formed.

The first body part 11A is disposed between the second body part 11B and the air electrode layer 32. The first body part 11A has a peripheral part (second part) 12b and a plurality of linear projections (first part) 12c.

The linear projections 12c are disposed on the air electrode 32a out of the air electrode layer 32. Each of the plurality of linear projections 12c is provided so as to protrude from the surface on the air electrode layer 32 side of the first separator body 11 toward the air electrode layer 32 side. Each of the plurality of linear projections 12c is provided along the x direction. The plurality of linear projections 12c are arranged mutually at intervals along the y direction. The flow paths 12a are demarcated and formed between the adjacent linear projections 12c, and between the linear projections 12c and the peripheral part 12b.

In the peripheral part 12b, a throughhole 12d (see FIG. 3) constituting part of the fuel gas flow path 62 through which the fuel gas to the fuel electrode 33a passes is formed. The peripheral part 12b is disposed on the peripheral part 32b.

In each of the plurality of linear projections 12c, a plurality of via hole electrodes 12c1 are embedded. The plurality of via hole electrodes 12c1 are formed so as to penetrate through the plurality of linear projections 12c in the z direction. Further in the first separator body 11, a plurality of via hole electrodes 11c are formed at positions corresponding to positions of the plurality of via hole electrodes 12c1. The plurality of via hole electrodes 11c are formed so as to penetrate through the first separator body 11. The plurality of via hole electrodes 11c and the plurality of via hole electrodes 12c1 constitute the plurality of interconnectors 13. The interconnectors 13 are electrically connected to the air electrode 32a. The interconnectors 13 lead from the surface on the opposite side to the first separator body 11 of the linear projections 12c to the surface on the opposite side to the linear projections 12c of the first separator body 11. Here, the shape of the interconnectors 13 is not especially limited. The interconnectors 13 may be, for example, of a polygonal column shape such as a tetragonal column shape or a trigonal column shape, or of a circular column shape.

The material of the first separator body 11 is not especially limited. The first separator body 11 can be formed of, for example, a stabilized zirconia or a partially stabilized zirconia. A specific example of a stabilized zirconia to be preferably used includes 8YSZ. A specific example of a partially stabilized zirconia to be preferably used includes 3YSZ. Further the first separator body 11 may be constituted of, for example, an electroconductive ceramic such as a rare earth metal-doped lanthanum chromite, a rare earth metal-doped strontium titanate or an aluminum-substituted lanthanum ferrate, or an insulating ceramic such as alumina, magnesia or strontium titanate.

The interconnectors 13 can be constituted of, for example, an Ag—Pd alloy, an Ag—Pt alloy, an alkaline earth metal-added lanthanum chromite ($LaCrO_3$), lanthanum ferrate ($LaFeO_3$), or LSM.

As shown in FIG. 9 and FIG. 10, the first middle layer 15 is disposed between the air electrode 32a and the separator body 11. Specifically, the first middle layer 15 is disposed between the air electrode 32a and the plurality of linear projections (the first part) 12c of the separator body 11. The first middle layer 15 does not contact with the peripheral part (the second part) 12b provided with the fuel gas flow path 62 through which the fuel gas passes. Therefore, the first middle layer 15 does not substantially contact with the fuel gas.

The first middle layer 15 contains a $(Ce_{1-x}D_x)O_2$ wherein D is at least one selected from the group consisting of Y, La, Pr, Nd, Sm, Eu, Gd, Tb, Dy, Ho, Er, Tm, Yb and Lu, and $0\leq x\leq0.5$. The first middle layer 15 is preferably constituted substantially of a $(Ce_{1-x}D_x)O_2$ wherein D is at least one selected from the group consisting of Y, La, Pr, Nd, Sm, Eu, Gd, Tb, Dy, Ho, Er, Tm, Yb and Lu, and $0\leq x\leq0.5$.

(Second Separator 50)

The second separator 50 is arranged on the fuel electrode layer 33 of the power generating component 30. The second separator 50 has a function of forming flow paths 52a to supply the fuel gas, supplied from the fuel gas flow path 62, to the fuel electrode 33a. Further in a fuel cell having a plurality of power generating components, the second separator simultaneously has also a function of separating the fuel gas and the oxidizing agent gas.

The second separator 50 has a second separator body 51 and a second flow path forming member 52. The second separator body 51 is disposed on the fuel electrode 33a. In the second separator body 51, throughholes 51a, 51b (see FIG. 8) constituting part of the flow paths 61, 62 are formed.

The second flow path forming member 52 is disposed between the second separator body 51 and the fuel electrode layer 33. The second flow path forming member 52 has a peripheral part 52b and a plurality of linear projections 52c.

In the peripheral part 52b, a throughhole 52d (see FIG. 7) constituting part of the fuel gas flow path 62 is formed.

Each of the plurality of linear projections 52c is provided so as to protrude from the surface on the fuel electrode layer 33 side of the second separator body 51 toward the fuel electrode layer 33 side. Each of the plurality of linear projections 52c is provided along the y direction perpendicular to the extending direction of the linear projections 52c. The plurality of linear projections 52c are arranged mutually at intervals along the x direction. The flow paths 52a are demarcated and formed between the adjacent linear projections 52c, and between the linear projections 52c and the peripheral part 52b. Hence, the extending direction of the flow paths 52a and the extending direction of the flow paths 12a are orthogonal.

Materials of the second separator body 51 and the second flow path forming member 52 are not especially limited. Each of the second separator body 51 and the second flow path forming member 52 can be formed of, for example, a stabilized zirconia or a partially stabilized zirconia. Each of the second separator body 51 and the second flow path forming member 52 can be formed of not only an electro-conductive ceramic such as a lanthanum chromite doped with a rare earth metal or the like, a strontium titanate doped with a rare earth metal or the like or an aluminum-substituted lanthanum ferrate, but also an insulating ceramic such as alumina, magnesia or strontium titanate.

As shown in FIG. 9 and FIG. 10, in each of the plurality of linear projections 52c, a plurality of via hole electrodes 52c1 are embedded. In the second separator body 51, a plurality of via hole electrodes 51c are formed at positions corresponding to positions of the plurality of via hole electrodes 52c1. The plurality of via hole electrodes 51c are electrically connected to the plurality of via hole electrodes 52c1. The plurality of via hole electrodes 51c are formed so as to penetrate through the second separator body 51. The plurality of via hole electrodes 51c and the plurality of via hole electrodes 52c1 constitute the interconnectors 14 to lead out the fuel electrode 33a to the outside.

The interconnectors 14 have a portion containing at least one selected from the group consisting of Ag, Pd, Pt, Fe, Co, Cu, Ru, Rh, Re and Au. In the present embodiment, the interconnectors 14 specifically have a portion containing Ag. The interconnectors 14 more specifically have a portion composed of an Ag—Pd alloy. Still more specifically, the entire of the interconnectors 14 is composed of an Ag—Pd alloy. In the case where the interconnectors 14 are constituted using an Ag—Pd alloy, the gas barrier property of the interconnectors 14 is high because the density thereof is easily raised.

As described above, if the air electrode and the solid oxide electrolyte layer react, a layer having low ionic conductivity is formed. Hence, if the air electrode and the solid oxide electrolyte layer react, the power generating efficiency of the solid oxide fuel cell decreases. On the other hand, since the separator 10 is provided with the interconnectors 13, the ionic conductivity is not required to the separator body 11. Therefore, it is seemingly conceivable that even if the air electrode and the separator body react to thereby form a layer having low ionic conductivity between the air electrode and the separator body, the power generating efficiency of the solid oxide fuel cell 1 does not decrease. As a result of exhaustive studies, however, the present inventor has found that if the air electrode and the separator body react, constitutional elements of the air electrode diffuse to the separator body, and the air electrode deteriorates, and as a result, the power generating efficiency of the solid oxide fuel cell decreases. As a result, it has been thought of that a first middle layer 15 is disposed between the separator body and the air electrode.

That is, in the solid oxide fuel cell 1, between the air electrode 32a and the solid oxide electrolyte layer 31, there is disposed the first middle layer 15 containing a $(Ce_{1-x}D_x)O_2$ wherein D is at least one selected from the group consisting of Y, La, Pr, Nd, Sm, Eu, Gd, Tb, Dy, Ho, Er, Tm, Yb and Lu, and $0 \leq x \leq 0.5$. Hence, the reaction between the air electrode 32a and the solid oxide electrolyte layer 31 is suppressed. Therefore, the power generating efficiency hardly deteriorates over time, and the solid oxide fuel cell 1 having excellent reliability can be realized.

The case where x is 0 is more preferable because the reaction between the air electrode 32a and the solid oxide electrolyte layer 31 is more effectively suppressed.

Then, it is also conceivable that the first middle layer 15 may be provided on the entirety of the air electrode layer 32. In this case, however, the first middle layer 15 constituted of a $(Ce_{1-x}D_x)O_2$ contacts with the fuel gas. Therefore, the first middle layer 15 is liable to cause cracks. In the present embodiment, the first middle layer 15 is provided so as not to contact with the peripheral parts 32b, 12b. Hence, the contact of the first middle layer 15 with the fuel gas is suppressed. Therefore, the first middle layer 15 hardly causes cracks. As a result, better reliability can be achieved.

A method for manufacturing the solid oxide fuel cell according to the present embodiment is not especially limited. However, it is desirable that a separator and a power generating component are manufactured using a ceramic-monolithic firing technology. The accuracy and the mass productivity can thereby be enhanced. Further even in the case where such monolithic firing is carried out, according to the present invention, the middle layer can effectively suppress the diffusion of constitutional elements of the air electrode into the separator body.

Hereinafter, another example of preferred embodiments carrying out the present invention will be described. In the following description, members having functions substantially common to the first embodiment will be referred to by the common reference signs, and descriptions will be omitted.

Second Embodiment

Figure 11:
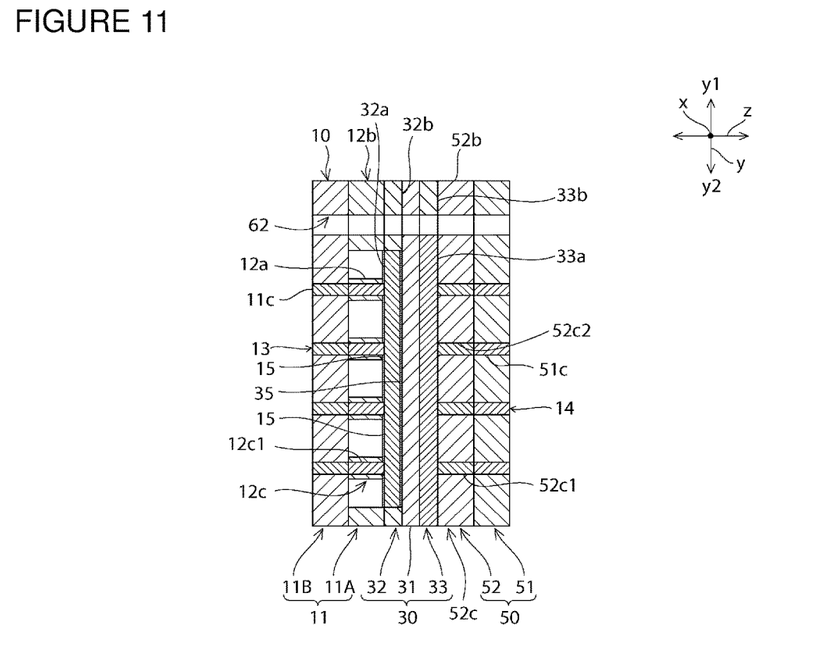
FIG. 11 is a schematic cross-sectional view of a fuel cell according to a second embodiment.

FIG. 11 is a schematic cross-sectional view of a fuel cell according to a second embodiment. As shown in FIG. 11, a first middle layer 15 may be provided also on portions which flow paths 12a of an air electrode 32a face, in addition to between a first separator body 11 and the air electrode 32a. In this case, the first middle layer 15 is preferably constituted of a porous body having open pores.

Experimental Example 1

Material powders were mixed with an organic solvent (mixture of ethanol and toluene) and a polyvinylbutyral-based binder so that the composition of each constituting member became the following composition, and thereafter shaped into a sheet shape by using a doctor blade to thereby fabricate a green sheet or a paste for the each constituting member.

A second body part 11B: 3YSZ ($ZrO_2$ stabilized with an amount of 3% by mol of $Y_2O_3$ added)

A first and second linear projections 12c, 52c: 70% by mass of 3YSZ ($ZrO_2$ stabilized with an amount of 3% by mol of $Y_2O_3$ added) and 30% by mass of a carbon powder added thereto A first middle layer 15: $CeO_2$ An air electrode 32a: 65% by mass of $La_{0.6}Sr_{0.4}Co_{0.2}Fe_{0.8}O_3$ and 35% by mass of a carbon powder added thereto A second middle layer 35: $CeO_2$ A solid oxide electrolyte layer 31: ScSZ ($ZrO_2$ stabilized with 10% by mol of $Sc_2O_3$ and 1% by mol of $CeO_2$)

A fuel electrode 33a: a mixture of NiO (65% by mass) and ScSZ (35% by mass), and 30% by mass of a carbon powder added to the mixture A separator body 51: 3YSZ ($ZrO_2$ stabilized with an amount of 3% by mol of $Y_2O_3$ added)

With respect to interconnectors, a material powder was mixed with an organic solvent (mixture of ethanol and toluene) and an ethylcellulose resin so that the composition of the interconnectors became the following composition to thereby fabricate a paste.

Interconnectors 13: $La_{0.6}Sr_{0.4}Co_{0.2}Fe_{0.8}O_3$

Interconnectors 14: a mixture of NiO (70% by mass) and $TiO_2$ (30% by mass)

The fabricated green sheet and paste were stacked and monolithically fired to thereby fabricate substantially the same solid oxide fuel cell as the solid oxide fuel cell 1 according to the first embodiment under the following condition. Here, the thickness of each layer, the firing condition and the like were as follows.

Thickness of the first middle layer: 30 μm

The warm water isotropic pressure pressing condition of the stacked body: 1,000 kgf/cm², 80° C., 2 min Degreasing: 400° C.

Firing: 1,200° C., 5 hours

Thickness of a fuel electrode: 30 μm

Thickness of a solid oxide electrolyte layer: 30 μm

Thickness of a second middle layer: 10 μm

Thickness of an air electrode: 30 μm

Thickness of a first body part: 360 μm

Thickness of a second body part: 240 μm

Experimental Example 2

A solid oxide fuel cell was fabricated as in Experimental Example 1, except for altering the thickness of a first middle layer to 10 μm.

Experimental Example 3

A solid oxide fuel cell was fabricated as in Experimental Example 1, except for constituting a first middle layer of $Gd_{0.2}Ce_{0.8}O_2$.

Experimental Example 4

A solid oxide fuel cell was fabricated as in Experimental Example 3, except for altering the thickness of a first middle layer to 10 μm.

Experimental Example 5

A solid oxide fuel cell was fabricated as in Experimental Example 3, except for providing no first middle layer.

(Evaluations)

Then, a 66% $H_2$—$N_2$ gas containing 15.5% of water vapor, and air were supplied at 750° C. to each of the solid oxide fuel cells fabricated in Experimental Examples 1 to 5, to thereby generate a power for 16 hours. Thereafter, the resistance of the air electrode was measured by measuring the alternating-current impedance. The results are shown in the following Table 1.

The reactivity between the air electrode and the separator body was evaluated by subjecting the cross-section of the fabricated solid oxide fuel cell to a constitutional element analysis using an electron probe microanalyzer (FE-EPMA-WDX, model No.: JXA-8500F, made by JEOL Ltd.) and checking the diffusion of elements between the air electrode and the separator. The results are shown in the following Table 1. In Table 1, "X" represents the case where the degree of diffusion of elements of air electrode components was large. "O" represents the case where the air electrode components did not diffuse, but the diffusion of Gd of the middle layer was observed. "◎" represents the case where no diffusion was observed in either.

TABLE 1

| | Composition of the First Middle Layer | Thickness of the First Middle Layer (μm) | Resistance of the Air Electrode (Ωcm²) | Reactivity |
|---|---|---|---|---|
| Experimental Ex. 1 | $CeO_2$ | 30 | 0.2 | ◎ |
| Experimental Ex. 2 | $CeO_2$ | 10 | 0.2 | ◎ |
| Experimental Ex. 3 | $Gd_{0.2}Ce_{0.8}O_2$ | 30 | 0.2 | O |
| Experimental Ex. 4 | $Gd_{0.2}Ce_{0.8}O_2$ | 10 | 0.2 | O |
| Experimental Ex. 5 | no first middle layer | 0 | 0.8 | X |

From the results shown in Table 1, it is clear that the installation of a first middle layer enabled an increase in the resistance of an air electrode to be suppressed. It is also clear that the case where the composition of a first middle layer was $CeO_2$ and contained no D enabled the reaction between an air electrode and a separator body to be more effectively suppressed.

REFERENCE SIGNS LIST

1 SOLID OXIDE FUEL CELL
10 FIRST SEPARATOR
11 SEPARATOR BODY
11A FIRST BODY PART
11B SECOND BODY PART
11a, 11b, 12d, 31a, 31b, 32c, 32d, 33c, 33d, 51a, 51b, 52d THROUGHHOLE
12a, 52a FLOW PATH
12b, 52b, 32b, 33b PERIPHERAL PART
12c, 52c LINEAR PROJECTION
13, 14 INTERCONNECTOR
15 FIRST MIDDLE LAYER
30 POWER GENERATING COMPONENT
31 SOLID OXIDE ELECTROLYTE LAYER
32 AIR ELECTRODE LAYER
32a AIR ELECTRODE

33 FUEL ELECTRODE LAYER
33a FUEL ELECTRODE
35 SECOND MIDDLE LAYER
50 SECOND SEPARATOR
51 SECOND SEPARATOR BODY
52 SECOND FLOW PATH FORMING MEMBER
61 OXIDIZING AGENT GAS FLOW PATH
62 FUEL GAS FLOW PATH

The invention claimed is:

1. A fuel cell comprising:
a power generating component comprising a solid oxide electrolyte layer, an air electrode disposed on a first surface of the solid oxide electrolyte layer and comprising a perovskite oxide, and a fuel electrode disposed on a second surface of the solid oxide electrolyte layer;
a first separator adjacent the air electrode and defining an air flow path facing the air electrode, the first separator comprising a first separator body and a first interconnector penetrating the first separator body, the first interconnector having an end directly connected to the air electrode;
a second separator adjacent the fuel electrode and defining a fuel gas flow path facing the fuel electrode, the second separator having a second interconnector disposed therein and connected to the fuel electrode; and
a middle layer disposed in a first region between the first separator body and the air electrode and not in a second region between the end of the first interconnector and the air electrode, the middle layer comprising a material that suppresses diffusion of constitutional elements of the air electrode to the first separator body,
wherein the first separator body comprises:
a first part adjacent the air electrode and having a first surface on a side of the air electrode and a second surface opposite to the first surface, and defining the air flow path; and
a second part stacked on the second surface of the first part and disposed on a region of the power generating component where the air electrode is not provided and defining a fuel gas flow path through which a fuel gas to be supplied to the fuel electrode passes,
wherein the middle layer does not contact the second part.

2. The fuel cell according to claim 1, wherein the middle layer is a ceramic.

3. The fuel cell according to claim 1, wherein the separator body is a ceramic.

4. The fuel cell according to claim 2, wherein the middle layer comprises $(Ce_{1-x}D_x)O_2$ wherein D is at least one selected from the group consisting of Y, La, Pr, Nd, Sm, Eu, Gd, Tb, Dy, Ho, Er, Tm, Yb and Lu, and $0 \leq x \leq 0.5$.

5. The fuel cell according to claim 4, wherein x is 0.

6. The fuel cell according to claim 1, further comprising a second middle layer between the solid oxide electrolyte layer and the air electrode.

7. The fuel cell according to claim 6, wherein the second middle layer comprises $(Ce_{1-x}D_x)O_2$ wherein D is at least one selected from the group consisting of Y, La, Pr, Nd, Sm, Eu, Gd, Tb, Dy, Ho, Er, Tm, Yb and Lu, and $0 < x \leq 0.5$.

8. The fuel cell according to claim 1, wherein the air electrode is $ABO_3$ wherein A is at least one among rare earth elements and alkaline earth elements, and B is at least one selected from the group consisting of Co, Fe and Ni.

9. The fuel cell according to claim 8, wherein the air electrode comprises at least one selected from the group consisting of $(La,Sr)CoO_3$, $(Sm,Sr)CoO_3$, $(La,Sr)FeO_3$, $(La,Sr)(Co,Fe)O_3$, $(Ba,Sr)(Co,Fe)O_3$ and $La(Ni,Fe)O_3$.

10. The fuel cell according to claim 1, wherein the separator body comprises at least one of stabilized zirconias and partially stabilized zirconias.

11. The fuel cell according to claim 1, wherein a material of the fuel electrode is selected from the group consisting of nickel oxide, a Ni-containing yttrium oxide-stabilized zirconia, a Ni-containing calcium oxide-stabilized zirconia, a Ni-containing scandium oxide-stabilized zirconia, a Ni-containing cerium oxide-stabilized zirconia, a Ni-containing titanium oxide, a Ni-containing alumina, a Ni-containing magnesia, a Ni-containing yttria, a Ni-containing niobium oxide, and a Ni-containing tantalum oxide.

12. The fuel cell according to claim 1, wherein the second separator comprises:
a first part adjacent the fuel electrode and defining the fuel gas flow path; and
a second part disposed on a region of the power generating component where the fuel electrode is not provided and defining the air flow path.

13. The fuel cell according to claim 1, wherein an extending direction of the fuel gas flow path is orthogonal to an extending direction of the air flow path facing the air electrode.

* * * * *